United States Patent Office.

WILLIAM H. BARR, OF MONTEREY, KENTUCKY.

Letters Patent No. 103,411, dated May 24, 1870.

IMPROVED LINIMENT.

The Schedule referred to in these Letters Patent and making part of the same.

To all whom it may concern:

Be it known that I, WILLIAM H. BARR, of Monterey, in the county of Owen and State of Kentucky, have invented a new and Improved Liniment; and I do hereby declare that the following is a full, clear, and exact description of the same.

The ingredients of which this liniment is composed, and the proportions, by measure, in which they are compounded, are as follows: alcohol, thirty-two parts; oil of turpentine, one part; sweet oil, one part; capsicum, one part; gum camphor, one part; tincture of iodine, one-half part.

This compound is found to afford great relief to persons afflicted with pains, especially those of a rheumatic nature. The elements are mechanically mixed, no chemical union taking place.

Having thus described my invention,

What I claim as new, and desire to secure by Letters Patent, is—

The liniment composed of the ingredients herein described.

WM. H. BARR.

Witnesses:
E. S. CALVERT,
T. J. HARDIN.